US009818149B1

(12) United States Patent
Sadhana (10) Patent No.: US 9,818,149 B1
(45) Date of Patent: Nov. 14, 2017

(54) AUTOMATED ELECTRONIC COMMERCE SITE MIGRATION

(75) Inventor: Vishnu V. Sadhana, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1014 days.

(21) Appl. No.: 13/305,555

(22) Filed: Nov. 28, 2011

(51) Int. Cl.
*G06Q 30/00* (2012.01)
*G06Q 30/06* (2012.01)
*G06F 17/30* (2006.01)

(52) U.S. Cl.
CPC ..... *G06Q 30/0641* (2013.01); *G06F 17/3089* (2013.01); *G06Q 30/0601* (2013.01); *G06F 17/30002* (2013.01); *G06F 17/30864* (2013.01)

(58) Field of Classification Search
CPC ..... G06C 30/06–30/0645; G06C 30/08; G06C 30/00; G06F 17/30286; G06F 17/30; Y10S 707/99931
USPC ................................................ 705/26.1–27.2
See application file for complete search history.

(56) References Cited

U.S. PATENT DOCUMENTS

| | | | | | |
|---|---|---|---|---|---|
| 5,832,274 | A * | 11/1998 | Cutler | ............... | G06F 17/30067 707/E17.005 |
| 6,141,666 | A * | 10/2000 | Tobin | ............... | G06F 17/30893 707/E17.117 |
| 6,484,149 | B1 * | 11/2002 | Jammes | ............... | G06F 17/3089 705/26.62 |
| 6,732,331 | B1 * | 5/2004 | Alexander | ............ | G06F 17/218 707/999.01 |
| 7,672,877 | B1 * | 3/2010 | Acton | ................. | G06F 17/3089 705/26.1 |
| 2002/0038255 | A1 * | 3/2002 | Tarvydas | ............... | G06Q 30/06 705/26.43 |
| 2002/0082945 | A1 * | 6/2002 | Tenorio | ............. | G06F 17/30321 705/26.1 |
| 2002/0194194 | A1 * | 12/2002 | Fenton | ................ | G06F 17/3089 |
| 2003/0126139 | A1 * | 7/2003 | Lee | ..................... | G06F 17/2247 |
| 2006/0136309 | A1 * | 6/2006 | Horn et al. | .................... | 705/26 |
| 2007/0255631 | A1 * | 11/2007 | Schmidt | ................ | G06Q 10/06 705/7.26 |
| 2008/0167944 | A1 * | 7/2008 | Keithley et al. | ................ | 705/10 |
| 2009/0177499 | A1 * | 7/2009 | Westerberg | ............ | G06Q 40/08 705/4 |

OTHER PUBLICATIONS

Bhaginath, W. R., Shingade, S., & Shirole, M. (Aug. 2014). Virtualized dynamic URL assignment web crawling model. In Advances in Engineering and Technology Research (ICAETR), 2014 International Conference on (pp. 1-7). IEEE.*

* cited by examiner

*Primary Examiner* — Resha Desai
*Assistant Examiner* — Matthew Kaufmann
(74) *Attorney, Agent, or Firm* — Thomas | Horstemeyer, LLP (57) ABSTRACT

Disclosed are various embodiments for a service that retrieves network content from an electronic commerce system and identifies items and associated data within the network content. The information identified may be modified and/or made available for use in another electronic commerce system. Modifications made to the information may be used by the service to further improve the identification accuracy and/or capabilities.

20 Claims, 4 Drawing Sheets

AUTOMATED ELECTRONIC COMMERCE SITE MIGRATION

BACKGROUND

An electronic marketplace facilitates sales of items by merchants through a common network site. Migrating the electronic marketplace to a different network site may be a tedious and time-consuming operation.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to a tool that facilitates migration of an electronic marketplace from one network site to a different network site. In one embodiment, the tool retrieves network content from a network site surfacing an electronic commerce system. The network content is examined to identify items and data associated with the items such as, for example, identifiers, item classifications, prices, descriptions and other data associated with items. Additionally, the tool may identify design elements present in or associated with the network content.

In another embodiment, the tool may initiate more complex interactions with the electronic commerce system in order to determine further information. For example, the tool may initiate purchases of one or more items in order to determine the shipping methods available, tax rates and/or other information. The information identified may be made available for use in another electronic commerce system and/or modified by the merchant. In another embodiment, modifications made to the information by the merchant may be used by the tool to further improve the recognition accuracy and/or capabilities. In the following discussion, a general description of the system and its components is provided, followed by a discussion of the operation of the same.

Figure 1:
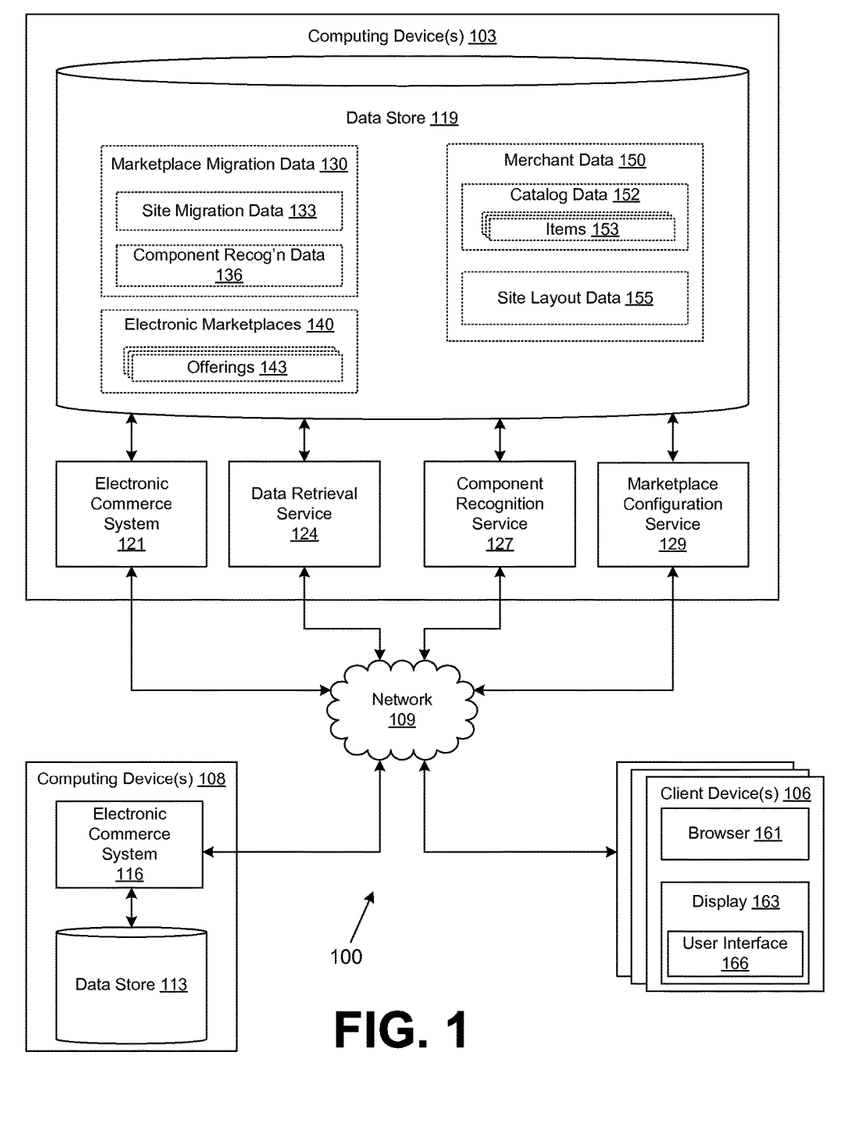
FIG. 1 is a drawing of a networked environment according to various embodiments of the present disclosure.

With reference to FIG. 1, shown is a networked environment 100 according to various embodiments. The networked environment 100 includes one or more computing devices 103, one or more client devices 106 and one or more computing devices 108 communicating by way of a network 109. The network 109 includes, for example, the Internet, intranets, extranets, wide area networks (WANs), local area networks (LANs), wired networks, wireless networks, or other suitable networks, etc., or any combination of two or more such networks.

Each computing device 108 may be operated by a cloud computing service provider or other provider. The computing device 108 may comprise, for example, a server computer or any other system providing computing capability. Alternatively, a plurality of computing devices 108 may be employed that are arranged, for example, in one or more server banks or computer banks or other arrangements. A plurality of computing devices 108 together may comprise, for example, a cloud computing resource, a grid computing resource, and/or any other distributed computing arrangement. Such computing devices 108 may be located in a single installation or may be distributed among many different geographical locations. For purposes of convenience, the computing device 108 is referred to herein in the singular. Even though each computing device 108 is referred to in the singular, it is understood that a plurality may be employed in the various arrangements as described above.

Various applications and/or other functionality may be executed in the computing device 108 according to various embodiments. Also, various data is stored in a data store 113 that is accessible to the computing device 108. The data store 113 may be representative of a plurality of data stores as can be appreciated. The data stored in the data store 113, for example, is associated with the operation of the various applications and/or functional entities described below.

The components executed on the computing device 108, for example, include an electronic commerce system 116 and other applications, services, processes, systems, engines, or functionality not discussed in detail herein. The electronic commerce system 116 is executed in order to facilitate the online purchase of items from one or more electronic marketplaces over the network 109. The electronic commerce system 116 also performs various backend functions associated with the online presence of an electronic marketplace in order to facilitate the online purchase of items. For example, the electronic commerce system 116 generates content pages such as, for example, web pages and/or other types of network content that are provided to clients 106 for the purposes of promoting and selecting items for purchase, rental, download, lease, or any other forms of consumption.

Each computing device 103 may be operated by a cloud computing service provider or other provider. The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though each computing device 103 is referred to in the singular, it is understood that a plurality may be employed in the various arrangements as described above.

Various applications and/or other functionality may be executed in the computing device 103 according to various embodiments. Also, various data is stored in a data store 119 that is accessible to the computing device 103. The data store 119 may be representative of a plurality of data stores as can be appreciated. The data stored in the data store 119, for example, is associated with the operation of the various applications and/or functional entities described below.

The components executed on the computing device 103, for example, include an electronic commerce system 121, a data retrieval service 124, the component recognition service 127, the marketplace configuration service 129, and other applications, services, processes, systems, engines, or functionality not discussed in detail herein. While the migration service is organized into separate logical components to facilitate discussion, the functionality of the components may be consolidated or partitioned into a different organization without affecting the operation of the migration service. The electronic commerce system 121 is executed in order to facilitate the online purchase of items from one or more electronic marketplaces over the network 109. The electronic commerce system 121 also performs various backend functions associated with the online presence of an electronic marketplace in order to facilitate the online purchase of items. For example, the electronic commerce system 121 generates content pages such as, for example, web pages and/or other types of network content that are provided to clients 106 for the purposes of promoting and selecting items for purchase, rental, download, lease, or any other forms of consumption.

The data retrieval service 124 is executed to facilitate retrieval of data from an electronic commerce system 116 surfaced via a network site over the network 109. The data retrieval service 124 may retrieve network content made available by a network site and may further be capable of duplicating all or portions of a network site. The data retrieval service 124 may communicate with the network site using HyperText Transfer Protocol (HTTP), HTTP Secure (HTTPS), Secure HTTP (S-HTTP), File Transfer Protocol (FTP) and/or other data communications protocols as can be appreciated. Additionally, the data retrieval service 124 may generate a content map of all or portions of the network content such as, for example, mapping a hierarchy of HyperText Markup Language (HTML) documents linked using Uniform Resource Locators (URLs).

The component recognition service 127 facilitates reproducing all or portions of an electronic commerce system 116 surfaced by a network site. The component recognition service 127 may identify and reproduce data associated with items available on an electronic commerce system 116 such as, for example, an identifier, description, price, promotions, classification within a taxonomy, reviews and other data associated with items. The component recognition service 127 may further interact with the electronic commerce system 116 to reproduce all or a portion of the configuration settings used for calculating tax for acquiring an item, as well as the methods available to ship an item. Additionally, the component recognition service 127 may reproduce all or portions of the design elements of an electronic commerce system 116 such as, for example, the formatting and layout of the network pages.

The marketplace configuration service 129 computes adjustments to the component recognition data 136 based at least in part upon modifications by a merchant to data associated with an electronic commerce system 116. The marketplace configuration service 129 may be accessible over the network 109 through one or more user-interfaces.

The data stored in the data store 119 includes, for example, marketplace migration data 130, electronic marketplaces 140, merchant data 150 and potentially other data. The marketplace migration data 130 includes the data associated with migrating components of an electronic commerce system 116 to an electronic commerce system 121. The marketplace migration data 130 further includes the site migration data 133 and the component recognition data 136. The site migration data 133 includes network content retrieved from a network site such as, for example, network pages, images, video, audio, metadata and/or other network content that may be retrieved from a network site. The component recognition data 136 includes metadata, rules, heuristics and/or other data to facilitate identifying elements of the site migration data 133 and/or other network content. As a non-limiting example, component recognition data 136 might include a heuristic suggesting that a network page having a clickable button displaying the text "Add to Shopping Cart" is likely a page offering an item 153.

Each electronic marketplace 140 may correspond to a distinct network site that targets various customers in the form of a storefront that offer items 153 for sale by a merchant. Each electronic marketplace 140 is surfaced to customers through the electronic commerce system 121 and may be associated with various data such as, for example, offerings 143 and/or other data. The offerings 143 relate to items 153 in the catalog data 152 that are specifically offered by a merchant within an electronic marketplace 140.

The merchant data 150 includes various data relating to merchants offering items 153 for ordering through electronic marketplaces 140. The merchant data may include catalog data 152, site layout data 155 and potentially other data. The catalog data 152 may be organized into a variety of item categories which may include information associated with a plurality of related items 153 that are offered in the electronic marketplaces 140. An item 153 may refer to a product, good, service, software download, multimedia download, social networking profile, or any combination, bundle, or package thereof, that may be offered for sale, purchase, rental, lease, download, and/or any other form of consumption and/or acquisition as may be appreciated. The various data stored in catalog data 152 may include, for example, titles, descriptions, classifications, quantities, conditions, images, options, weights, customer reviews, customer ratings, keywords, prices, promotions, shipping configuration, tax configuration, taxonomy of the items 153, unique identifiers, and any other data related to items 153. The site layout data 155 may include design elements related to the style, layout and/or formatting of the network content of the electronic commerce system 116.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. The client 106 may include a display 163. The display 163 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 161 and/or other applications. The browser 161 may be executed in a client 106, for example, to access and render network pages, such as web pages, or other network content served up by the computing device 103 and/or other servers, thereby rendering a user-interface 166 on the display 163. The client 106 may be configured to execute applications beyond the browser 161 such as, for example, email applications, instant message applications, and/or other applications.

Next, a general description of the operation of the various components of the networked environment 100 is provided. To begin, the component recognition service 127 identifies a network site surfacing an electronic commerce system 116 to be migrated. The component recognition service 127 may retrieve metadata associated with the electronic commerce system 116 from the component recognition data 136. The available metadata may be any information that may assist with migration of electronic commerce system 116 such as, for example, the location of identifiers of items 153 within the network content, the taxonomy in which the items 153 are organized, the location of design elements used in the network site and other metadata as can be appreciated. The metadata may be associated with a unique electronic commerce system 116 or more generally associated with various electronic commerce systems.

The component recognition service 127 may instruct the data retrieval service 124 to retrieve all or portions of the network content available through the electronic commerce system 116 based at least in part upon any associated metadata. To this end, the data retrieval service 124 may employ a crawler to retrieve the network content from the electronic commerce system 116 and store the network content in the site migration data 133. The component recognition service 127 may begin examining the site migration data 133 to identify and extract various catalog data 152, site layout data 155 and/or other data such as, for example, the items 153, the taxonomy into which the items 153 are organized, design elements and potentially other data. The component recognition service 127 may identify the data using metadata, rules and/or heuristics of the component recognition data 136. As a non-limiting example, the component recognition service 127 may identify a network page on which multiple items 153 are included as likely representing a classification of items 153.

Additionally, the component recognition service 127 may interact with the electronic commerce system 116 to further identify catalog data 152 such as, for example, the shipping configuration, tax configuration and potentially other data. As a non-limiting example, the component recognition service 127 may initiate a purchase of an item 153 through the electronic commerce system 116 using various different delivery addresses to track how different locations affect the acquisition tax rates and delivery methods available. The component recognition service 127 will be discussed below in more detail.

Through a client device 106, a merchant may access a user-interface of the marketplace configuration service 129. The marketplace configuration service 129 may permit the merchant to prepare one or more electronic marketplaces 140 with the offerings 143 to be made available through the electronic commerce system 121. To this end, the merchant may modify the catalog data 152, site layout data 155 and/or other data identified by the component recognition service 127 or otherwise associated with the migration. The marketplace configuration service 129 may track the modifications made by the merchant in order to improve the accuracy of the identification of the catalog data 152, site layout data 155 and/or other data identified by the component recognition service 127. As a non-limiting example, tracking data from a merchant removing an item 153 may be provided as input into a Bayesian classifier, a Decision Tree, a logistic regression model and/or other machine learning techniques to further refine the component recognition data 136 used to recognize items 153. The marketplace configuration service 129 will be discussed below in more detail.

Figure 2:
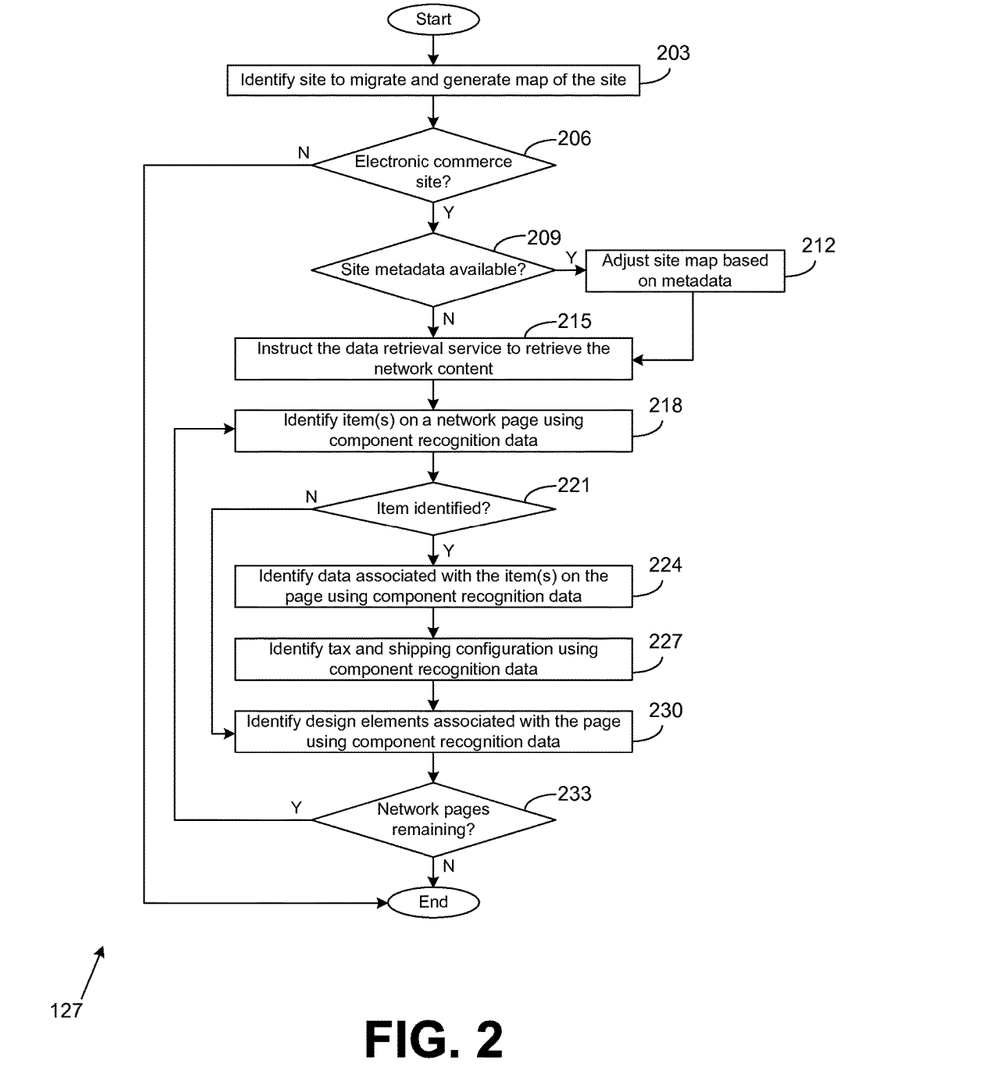
FIG. 2 is a flowchart illustrating one example of functionality implemented as portions of a component recognition service executed in a computing device in the networked environment of FIG. 1 according to various embodiments of the present disclosure.

Referring next to FIG. 2, shown is a flowchart that provides one example of the operation of a portion of the component recognition service 127 according to various embodiments. It is understood that the flowchart of FIG. 2 provides merely an example of the many different types of functional arrangements that may be employed to implement the operation of the portion of the component recognition service 127 as described herein. As an alternative, the flowchart of FIG. 2 may be viewed as depicting an example of steps of a method implemented in the computing device 103 (FIG. 1) according to one or more embodiments.

To begin, in box 203, the component recognition service 127 identifies a network site surfacing an electronic commerce system 116 (FIG. 1) that may potentially be migrated. The component recognition service 127 may further instruct the data retrieval service 124 (FIG. 1) to generate a content map of the network content of the network site. Next, in box 206, the component recognition service 127 may verify the network site specified is indeed offering electronic commerce services. The verification may include communicating with the network site to confirm the presence of an electronic shopping cart and/or other verification techniques as can be appreciated. If the specified network site cannot be verified as offering electronic commerce services, this portion of the execution of the component recognition service 127 may end as shown.

Alternatively, in box 209, if the network site is surfacing an electronic commerce system 116, the component recognition service 127 may determine if metadata associated with the electronic commerce system 116 is available from the component recognition data 136. The metadata may be any information that may assist with migration of electronic commerce system 116 such as, for example, the location of identifiers of items 153 within the network content, the taxonomy in which the items 153 are organized, the location of design elements used in the site and other metadata as can be appreciated. The metadata may be associated with a unique electronic commerce system 116 or may more generally be associated with various electronic commerce systems 116.

If, in box 212, metadata is available for the electronic commerce system 116, the component recognition service 127 may modify the content map based at least in part upon the available metadata for the electronic commerce system 116. Then, in box 215, the component recognition service 127 may instruct the data retrieval service 124 to retrieve all or portions of the network content available through the electronic commerce system 116. The instruction to retrieve network content may be based at least in part upon the content map.

Moving on, in box 218, the component recognition service 127 may begin examining network content of the site migration data 133 (FIG. 1) to identify and extract items 153 (FIG. 1) and/or other data. The component recognition service 127 may identify the items 153 and/or other data using metadata, rules and/or heuristics of the component recognition data 136. As a non-limiting example, component recognition data 136 might suggest that a network page having a clickable button displaying the text "Add to Shopping Cart" is likely a page offering an item 153. If, in box 221, the component recognition service 127 identifies an item 153, then, in box 224, the site migration data 133 may be further examined to identify additional catalog data 152 associated with the item 153 such as price, classification product description, and other data.

Next, in box 227, the component recognition service 127 may interact with the electronic commerce system 116 to further identify and extract available shipping methods, various tax rates and potentially other catalog data 152 (FIG. 1) associated with acquiring the item 153. As a non-limiting example, the component recognition service 127 may initiate a purchase of an item 153 through the electronic commerce system 116 using various different delivery addresses to track how different locations affect the acquisition tax rates and delivery methods available. In one embodiment, the component recognition service 127 may perform this interaction with the electronic commerce system 116 for every item 153. In another embodiment, the interaction may occur for a subset of the items 153 identified.

Subsequently, in box 230, the component recognition service 127 may further examine the site migration data 133 to identify and extract site layout data 155 (FIG. 1). The site layout data 155 may include design elements related to the style, layout and/or formatting of the network content of the electronic commerce system 116. If, in box 233, a network page remains to be examined, the component recognition service 127, in box 218, examines the next network page. Alternatively, execution of this portion of the component recognition service 127 ends as shown.

Figure 3:
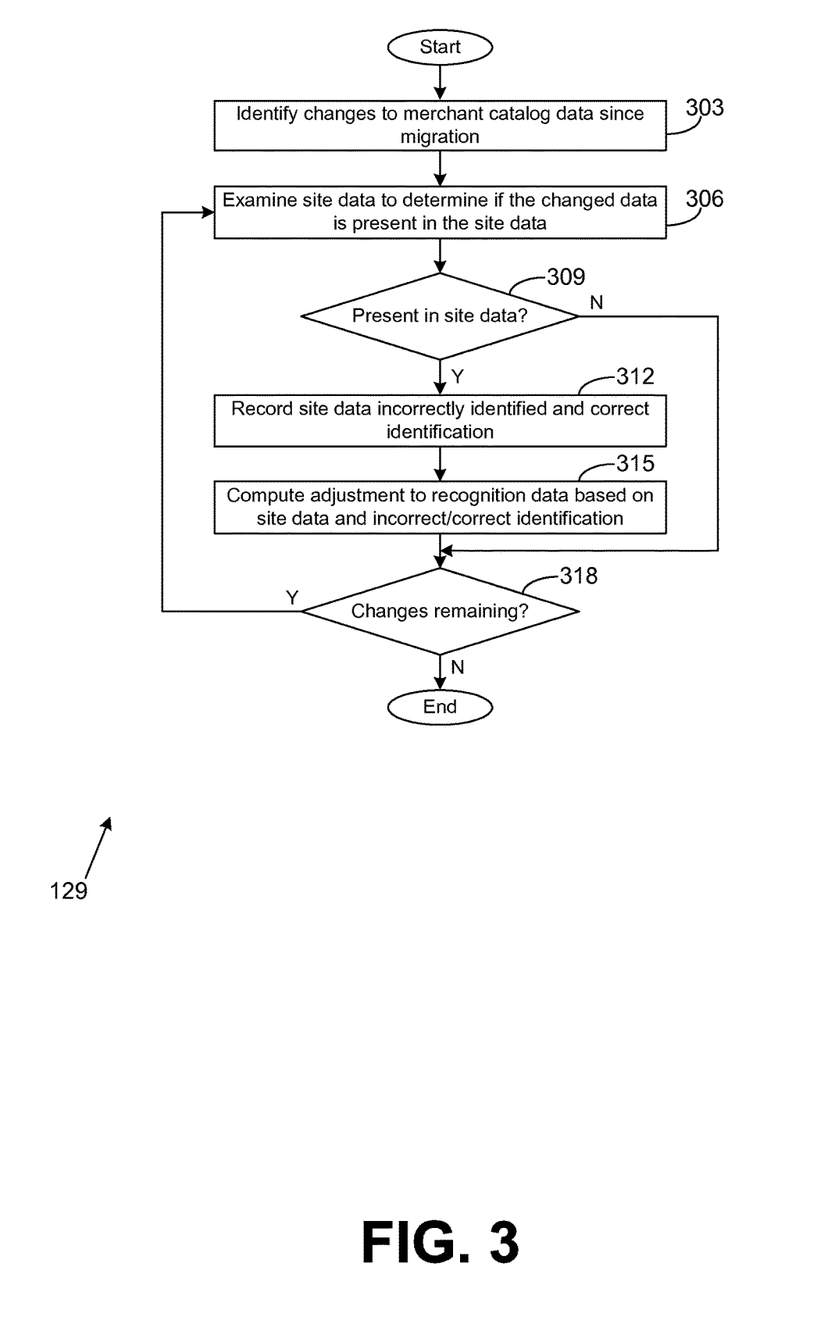
FIG. 3 is a flowchart illustrating one example of functionality implemented as portions of a marketplace configuration service executed in a computing device in the networked environment of FIG. 1 according to various embodiments of the present disclosure.

Referring next to FIG. 3, shown is a flowchart that provides one example of the operation of a portion of the marketplace configuration service 129 according to various embodiments. It is understood that the flowchart of FIG. 3 provides merely an example of the many different types of functional arrangements that may be employed to implement the operation of the portion of the marketplace configuration service 129 as described herein. As an alternative, the flowchart of FIG. 3 may be viewed as depicting an example of steps of a method implemented in the computing device 103 (FIG. 1) according to one or more embodiments.

Beginning with box 303, the marketplace configuration service 129 identifies modifications to the catalog data 152 (FIG. 1), site layout data 155 (FIG. 1) and/or other data identified by the component recognition service 127 (FIG. 1) or otherwise associated with the migration. As a non-limiting example, a modification may include adding and/or removing an item 153 (FIG. 1), changing formatting of the electronic marketplace 140 (FIG. 1) by modifying the site layout data 155 and other changes as can be appreciated. In one embodiment, the marketplace configuration service 129 may track the modifications to the catalog data 152, site layout data 155 and/or other data made by the merchant through a user-interface. In another embodiment, the marketplace configuration service 129 may identify changes in the catalog data 152, site layout data 155 and/or other data produced by logging changes made to the data as produced by the component recognition service 127.

Next, in box 306, the marketplace configuration service 129 may examine the site migration data 133 (FIG. 1) to identify the network components associated with the modified data. As a non-limiting example, the site migration data 133 may be examined to determine if an item 153 was present in the network content, but not identified as an item 153 by the component recognition service 127. If, in box 309, the marketplace configuration service 129 finds the modified data within the network content of the site migration data 133, in box 312, the modified data and the network content in which it was found may be stored for further processing. Alternatively, if the modified data is not found within the site migration data 133, in box 318, other modified data may be considered.

Moving on, in box 315, the marketplace configuration service 129 may compute an adjustment to the heuristics and/or other component recognition data 136 (FIG. 1) to further refine the accuracy of the component recognition service 127. The adjustments to the component recognition data 136 may be computed using a Bayesian classifier, a Decision Tree, a logistic regression model and/or other machine learning techniques based upon the modified data, the network component(s) in which the modified data was found and/or potentially other associated site migration data 133. As a non-limiting example, an item 153 removed by a merchant and the network page in which the misidentified item 153 was found may be provided as input into a Bayesian classifier to further refine the component recognition data 136 used to recognize items 153.

If, in box 318, no further modified data remains to be examined, execution of this portion of the marketplace configuration service 129 ends as shown. Alternatively, if additional modified data remains, in box 306, the marketplace configuration service 129 examines the additional modified data.

Figure 4:
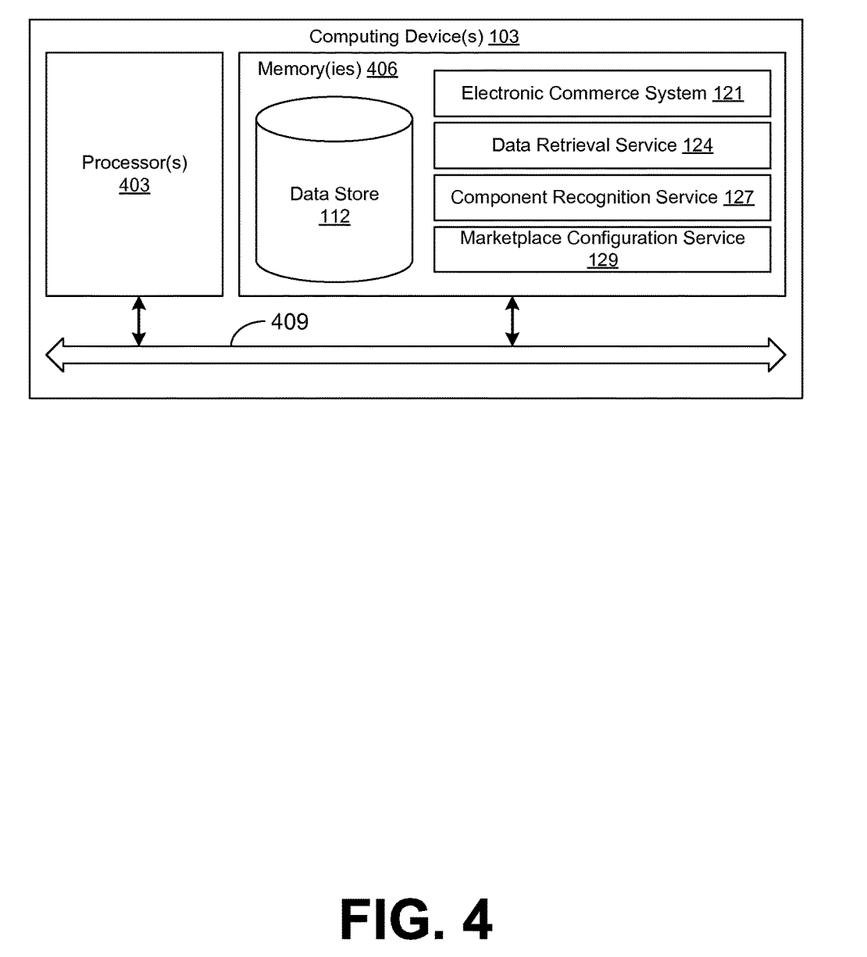
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the electronic commerce system 121, data retrieval service 124, component recognition service 127, marketplace configuration service 129, and potentially other applications. Also stored in the memory 406 may be a data store 119 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the electronic commerce system 121, data retrieval service 124, component recognition service 127, marketplace configuration service 129 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the component recognition service 127 and marketplace configuration service 129. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 121, data retrieval service 124, component recognition service 127 and marketplace configuration service 129, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program, when executed, causing the computing device to at least:

communicate with a first network site to perform a verification that the first network site implements an electronic commerce system by at least confirming a presence of an electronic shopping cart on the first network site;

employ a crawler to retrieve network content from a plurality of network pages of the electronic commerce system and store the network content as site migration data in at least one data store;

extract metadata corresponding to the electronic commerce system from the site migration data, wherein the metadata is stored as part of the site migration data in the at least one data store;

generate, in response to the verification, a map corresponding to the plurality of network pages from the electronic commerce system accessible via the first network site, the map being generated based at least in part on the metadata corresponding to the electronic commerce system;

retrieve, based at least in part on the map, at least one of the plurality of network pages from the electronic commerce system;

identify a plurality of product identifiers associated with the plurality of network pages, wherein the plurality of product identifiers correspond to a plurality of products and the plurality of product identifiers are identified using a set of rules;

identify a taxonomy associated with the plurality of products associated with the plurality of network pages, wherein the plurality of product identifiers are organized within the taxonomy and the taxonomy is identified using the set of rules;

identify a tax configuration corresponding to a plurality of sales tax rates for purchasing at least one of the plurality of products associated with the plurality of network pages;

identify a shipping configuration corresponding to at least one method of shipping the at least one of the plurality of products associated with the plurality of network pages;

identify a design configuration corresponding to a plurality of design elements associated with the plurality of network pages, wherein the plurality of design elements are identified using the set of rules;

store catalog data and the design configuration in the at least one data store, wherein the catalog data comprises at least the plurality of product identifiers, the taxonomy, the tax configuration and the shipping configuration; and configure a second network site to implement the electronic commerce system based on the catalog data and the design configuration stored in the at least one data store.

2. The non-transitory computer-readable medium of claim 1, wherein the program further causes the computing device to modify the set of rules based at least upon a modification of the catalog data by a user.

3. A system, comprising:

at least one computing device configured to at least:

communicate with a first network site to perform a verification that the first network site implements an electronic commerce system by at least confirming a presence of an electronic shopping cart on the first network site;

employ a crawler to retrieve network content from a plurality of network pages of the electronic commerce system and store the network content as site migration data in at least one data store;

extract metadata corresponding to the electronic commerce system from the site migration data, wherein the metadata is stored as part of the site migration data in the at least one data store;

generate a map of the plurality of network pages from the electronic commerce system accessible via the first network site based at least in part on the metadata associated with the electronic commerce system;

retrieve, based at least in part on the map, at least one of the plurality of network pages from the electronic commerce system accessible via the first network site;

identify a plurality of item identifiers associated with the at least one of the plurality of network pages, wherein the plurality of item identifiers correspond to a plurality of items and the plurality of item identifiers are identified using at least predefined recognition data;

identify a shipping configuration associated with the at least one of the plurality of network pages, the shipping configuration corresponding to a plurality of methods of shipping at least one of the plurality of items;

store catalog data in the at least one data store, wherein the catalog data comprises at least the plurality of item identifiers and the shipping configuration;

configure a second network site to implement the electronic commerce system based on the catalog data stored in the at least one data store; and modify the recognition data based at least upon a modification to the plurality of item identifiers by a user.

4. The system of claim 3, wherein the at least one computing device is further configured to identify a tax configuration corresponding to a plurality of acquisition tax rates for purchasing the at least one of the plurality of items.

5. The system of claim 4, wherein identifying the shipping configuration and the tax configuration comprises determining the plurality of acquisition tax rates and the methods of shipping based at least upon initiating acquisition of the at least one of the plurality of items using a plurality of delivery destinations.

6. The system of claim 3, wherein identifying the plurality of item identifiers further comprises identifying a taxonomy associated with the plurality of items, wherein the plurality of item identifiers are organized within the taxonomy and the taxonomy is identified using at least the recognition data.

7. The system of claim 3, wherein the modification to the plurality of item identifiers further comprises a removal of at least one of the plurality of item identifiers.

8. The system of claim 3, wherein the modification to the plurality of item identifiers further comprises an addition of a new item identifier to the plurality of item identifiers, wherein the new item identifier is associated with the at least one of the plurality of network pages.

9. The system of claim 3, wherein at least one exclusive portion of the recognition data is applicable based at least upon a recognition of the electronic commerce system.

10. The system of claim 9, wherein the least one exclusive portion of the recognition data further comprises the metadata, the metadata indicating a location of the plurality of item identifiers in the at least one of the plurality of network pages.

11. The system of claim 3, wherein identifying the plurality of item identifiers is further based at least in part on the map.

12. A method, comprising:
- communicating, by at least one computing device, with a first network site to perform a verification that the first network site implements an electronic commerce system by at least confirming a presence of an electronic shopping cart on the first network site;
- employing, by the at least one computing device, a crawler to retrieve network content from a plurality of network pages of the electronic commerce system and store the network content as site migration data in at least one data store;
- extracting, by the at least one computing device metadata corresponding to the electronic commerce system from the site migration data, wherein the metadata is stored as part of the site migration data in the at least one data store;
- generating, by the at least one computing device, a map of the plurality of network pages from the electronic commerce system via the first network site, the map being generated based at least in part on the metadata associated with the electronic commerce system;
- retrieving, by the at least one computing device, at least one of the plurality of network pages from the electronic commerce system accessible via the first network site;
- identifying, by the at least one computing device, after retrieving the at least one of the plurality of network pages, in the at least one of the plurality of network pages, a plurality of item identifiers, wherein the plurality of item identifiers correspond to a plurality of items and the plurality of item identifiers are identified using at least predefined recognition data;
- identifying, by the at least one computing device, a tax configuration associated with the at least one of the plurality of network pages, the tax configuration corresponding to a plurality of acquisition tax rates for purchasing at least one of the plurality of items;
- storing, by the at least one computing device, at least the plurality of item identifiers and the tax configuration in the at least one data store; and
- configuring, by the at least one computing device, a second network site to implement the electronic commerce system based on at least the plurality of item identifiers and the tax configuration stored in the at least one data store.

13. The method of claim 12, further comprising identifying, in the at least one computing device, a design configuration corresponding to a plurality of design elements associated with the plurality of network pages, wherein the plurality of design elements are identified using the recognition data.

14. The method of claim 12, further comprising modifying, in the at least one computing device, the recognition data based at least upon a modification of marketplace data by a user, wherein the marketplace data comprises the plurality of item identifiers and the tax configuration.

15. The method of claim 14, wherein modifying the recognition data is further based at least upon the user adding an item identifier to the plurality of item identifiers, wherein the item identifier was associated with the plurality of network pages.

16. The method of claim 15, wherein modifying the recognition data is a result of at least a Bayesian classification of a portion of a network page associated with the item identifier.

17. The method of claim 14, wherein modifying the recognition data is further based at least upon a removal of at least one of the plurality of item identifiers.

18. The method of claim 12, wherein at least one exclusive portion of the recognition data is applicable based at least upon a network address associated with the first network site.

19. The method of claim 18, wherein the at least one exclusive portion of the recognition data is provided by a user.

20. The method of claim 12, wherein identifying the plurality of item identifiers is further based at least in part on the map.

* * * * *